United States Patent [19]
Johns

[11] Patent Number: 4,841,667
[45] Date of Patent: Jun. 27, 1989

[54] FOIL FOR FLIES

[76] Inventor: Robert R. Johns, P.O. Box 7359, Oxnard, Calif. 93031

[21] Appl. No.: 27,890

[22] Filed: Mar. 19, 1987

[51] Int. Cl.⁴ ...................... A01K 85/00; A01K 85/08
[52] U.S. Cl. ................... 43/42.37; 43/42.25; 43/42.47
[58] Field of Search ................ 43/42.37, 42.47, 42.28, 43/42.25

[56] References Cited

U.S. PATENT DOCUMENTS

| | | | |
|---|---|---|---|
| 2,108,728 | 2/1938 | Schilling | 43/42.47 |
| 2,900,754 | 8/1959 | Orlik | 43/42.47 |
| 3,248,820 | 5/1966 | Lamar | 43/42.31 |
| 3,410,020 | 11/1968 | McClellan | 43/42.47 |
| 3,495,350 | 2/1970 | Lievense | 43/42.25 |
| 3,947,989 | 4/1976 | Bart | 43/42.31 |

FOREIGN PATENT DOCUMENTS 54921 2/1935 Norway .............................. 43/43.16

*Primary Examiner*—Gene P. Crosby
*Attorney, Agent, or Firm*—Marvin E. Jacobs

[57] ABSTRACT

The tracking characteristics of a fishing fly are improved by a detachable, reversible foil having a rear socket which engages the eye of a fishing hook and a front, angled section which causes the fly to wiggle and to rise or fall depending whether the front section is pointing upwardly or downwardly. The rear lip of the fly contains a socket adapted to engage the eye of the hook and a set of channels extending from the front surface of the foil to the socket for receiving the leader thread. The foil can be readily slid on the thread onto the eye of the hook in either orientation.

8 Claims, 2 Drawing Sheets

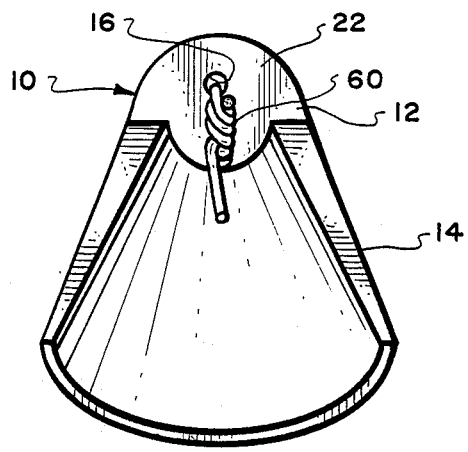
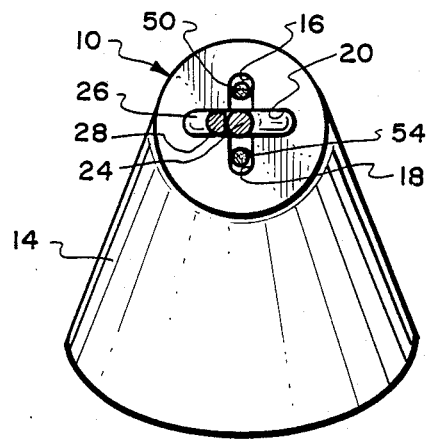
Fig. 4.    Fig. 5.
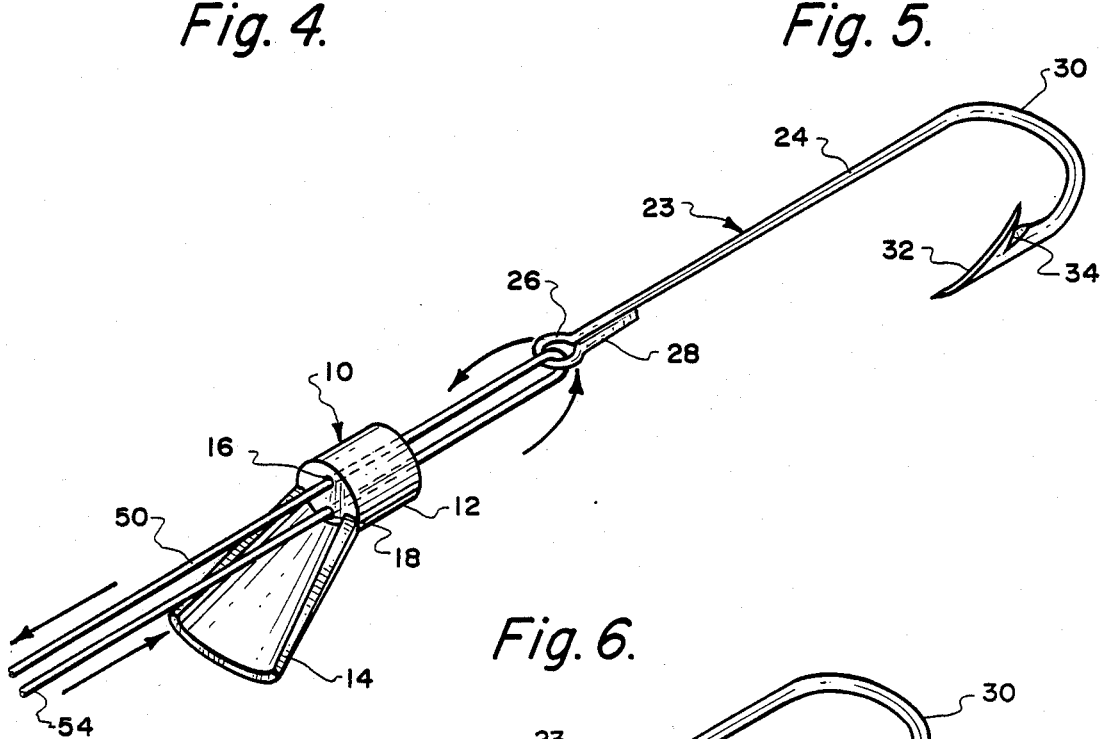
Fig. 6.
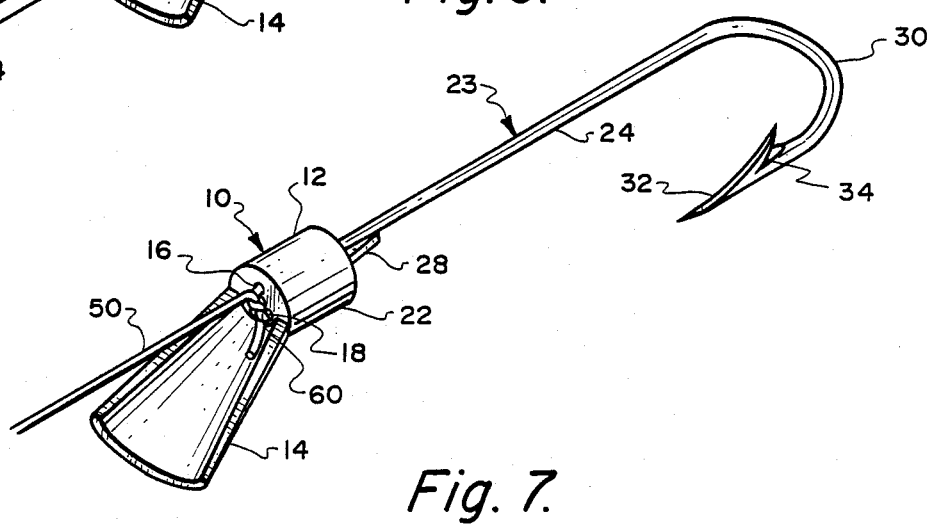
Fig. 7.

FOIL FOR FLIES

TECHNICAL FIELD

The present invention relates to fly fishing and more particularly, this invention relates to an improved foil-hook assembly providing flies with improved manuevering capabilities.

BACKGROUND OF THE INVENTION

Fishing, in general, is a rapidly expanding sport and every year more fishermen are converting from bait and spinning to fly-fishing. Fly-fishing offers more of a sport experience than a hunting experience. In fact, many fly fishermen try to avoid harming the hooked fish and return them to the water. Only fish that are so injured that they could not survive in the water are not returned. Not only is skill required in the hooking of fish but many fly fishermen tie their own flies.

There are many components to a fly and many types of flies. Though much attention has been directed to new and improved materials, little attention has been directed to hooks, even though fishing efficiency and fly characteristics are related to the hook. Strike potential, number of fish hooked and number of fish netted can all be increased by appropriate selection of the hook. Furthermore, most flies are formed of lightweight materials and do not offer much water resistance. They, therefore, have a poor angle of ascent or descent as they travel through the water. Most hooks on the market are not designed specifically for fly tying. They were originally designed for other applications.

The hooks available for fly tying have four types of eyes: turned up, turned down, ring and looped. The bend of the eye affects the attitude of the fly as it is pulled through the water. A down-turned eye causes the fly to swim at an up-turned angle and a turned-up eye causes the fly to swim at a slight diving angle. However, the flies using up-or down-turned eyes do not have good stability and can reverse. Turned down eyes can block large portions of the bite of a hook. Furthermore, since the bent eyes present the hook at an angle to the fish's mouth and tissue, the initial hooking is not as deep if the hook was straight and the pulling force is also not as forceful since only the component of the force parallel to the shaft of the hook is transmitted to the barbed end.

There are straight eye hooks containing a closed ring eye. Ring eyes do not provide a pleasing or realistic appearance on the head of a finished fly. A tapered loop eye provides a more streamlined profile and forms a much more attractively appearing fly. Tapered looped eyes are formed by drawing the wire to a taper and/or grinding the end of the shank to a smooth taper and then folding the tapered end back alongside the shank to form an eye. This provides an excellent platform to build a fly and provides the best appearing and streamlined configuration for the eye. Smoothly ground tapers do not cut the fragile leader and can be neatly and tightly bent to form a loop that is closed to retain the leader. However, tapered loop eyes are always provided in the up- or down- turned form.

Ring eyes present other problems. Ring eyes are usually not fully closed. The leader gets in the gap and the rough edge of the wire cuts the leader. If the eye is in-line with the shank, the fly will tend to hinge. The optimum hook for fly tying contains an eye formed of tapered wire with a straight loop disposed in a plane perpendicular to a plane through the shank and bend.

The patent literature does not disclose a straight loop, tapered eye hook. Shakespeare, Jr. (827,759), Jamison (1,502,781) and Forsyth (2,539,735) disclose a straight ring eye without a taper. Forsyth and Rice and Woodhead (2,841,914) dispose a ring eye in a plane parallel to the shank and bend. The only patent showing a straight loop eye formed of tapered wire in a fish hook is Sloan (1,635,644). However, Sloan forms the eye parallel to the bend which will cause hinging and the shank is provided with an offset bend.

Other examples of straight ring or loop eyes are found in the following patents:

| PATENTEE | PATENT NO. |
|---|---|
| Cox | 975,833 |
| Foss | 1,420,422 |
| Fitch | 1,851,698 |
| Shaff | 1,953,642 |
| Knell | 2,038,940 |
| Grant | 2,178,301 |
| Sivey et al | 2,533,523 |
| Kreps | 2,544,796 |
| Runerle | 4,411,089 |
| Rye | 4,557,065 |

Flies are usually formed of lightweight materials such as thread, fur and feathers so that they float on top of the water. When using flies for streamer or bait fish application, it is desired to have the fly sink as fast as possible when casting toward the bank of a river or lake or when reeling the fly in. Providing erratic motion also can provide a swimming motion simulating a live insect. Bills or other appendages are commonly provided on plastic and metal lures to provide erratic or diving characteristics.

Though there are no commercial bills or foils being marketed, the patent literature has examples of devices that have been designed to affect the movement of flies through the water as follows:

| PATENTEE | PATENT NO. |
|---|---|
| Hayes | 1,490,389 |
| Peckinpaugh | 1,781,598 |
| Davenport | 2,018,622 |
| Richards | 2,231,507 |
| Weesner | 2,290,512 |
| McFarland | 2,587,189 |
| Lauterwasser | 2,594,038 |
| Sharps | 2,651,133 |
| Dudley | 2,683,323 |
| Markquart | 2,696,693 |
| Lievense | 3,495,350 |
| Waters, Jr. | 3,729,850 |
| Neal | 3,864,863 |
| Rogers | 4,149,334 |
| Pond | 4,380,884 |

The bills or foils shown in these patents become integrated with the fly usually by being tied onto the hook by thread or filament. The bill or foil becomes fixed and can only be utilized for inducing upward or downward movement of the fly. The foil must be separately manipulated during assembly of the fly.

Hill, Jr. (1,2905,370) places a weight with a flat surface above the bend of a hook. Porter (2,185,666) adds a flat sinker plate near the eye of a hook. Leonardi (2,808,678) places a weight on the shank of a lower hook in a double hook device. Spencer (3,604,741)

forms a triple hook within a ball-shaped sinker. Ostrom (3,500,576) adds a weight near the eye of a lure. Kochevar (3,638,347) attaches a moldable sinker to a line. Gwaldacz (4,530,180) adds round weights to the shank of a bent hook.

Another problem is that certain flies become heavier than desired toward the eye end of the hook or lay over on their sides. The fly will tend to dip and not present itself in a realistic manner to the fish. The effect of imitating or simulating an insect is diminished. This problem has been recognized and various measures have been designed to counterbalance the fly by adding weight to the hook. A typical measure used presently is to wrap with lead wire.

Koch (U.S. Pat. Nos. 745,066 and 775,727) placed a sliding bead on the bend of the hook to act as a sinker. The hook is designed for minnows, not for fly tying. These weights are not stationery and do not form a smooth surface with the shaft of the hook. Flies made with the Koch hooks may float more horizontally but the weights are unattractive and will interfere with hooking and catching fish. The beads significantly reduce the area of the hook on which the fish bites resulting in poorly embedded barbs. Such hooks frequently tear loose leaving a wounded fish who is then ready prey for other fish.

A hook that is both attractive to the purchaser, realistically appearing to the fish and providing improved balance and swimming characteristic to a fly is a hook formed of cylindrical wire having a smoothly reduced diameter from the tip of the barb to the bend and then a taper extending from the bend through the eye to form a low profile tapered loop eye. A similar hook without a tapered eye was shown in Shakespeare, Jr. (827,757) who added extra metal at the bend to increase the strength of a hook while decreasing its weight.

Statement of Invention

A hook and foil system have been designed for fly tying that provides optimum characteristics to a fly whether floating, diving or rising. The foil is designed to be reversible and detachable from the eye of the hook. The hook-foil system is attractive, relatively inexpensive to manufacture and is attractive to the customer and realistic to the fish.

The hook-foil combination of the invention includes a foil of rigid, lightweight material, suitably a clear or colored resin such as acrylic, and a hook having a low profile eye received in a socket in the front end of the foil. The foil has a horizontal front section joined to an angled, rear section. Two filament receiving passages extend from the rear surface of the foil into the socket.

The leader filament is fed through one passage through the socket and the eye of the hook, back through the socket and the second passage. The foil can be slid away from the hook with the fly materials tied to it and the fly removed. The foil can be readily reversed by rotating the foil 180 degrees and sliding it forward until the eye of the hook is seated by force-fit in the socket.

Preferred hooks have a straight tapered shank and loop with the loop formed along the side of the shank since this provides a more stable assembly with a bill and more stable floating characteristics than a vertical loop. Furthermore, if the eye was bent it would not be possible to have a symmetrical, reversible foil. The hook may also be tapered forwardly of the bend to the point to counterbalance the fly and the bill.

These and many other features and attendant advantages of the invention will become apparent as the invention becomes better understood by reference to the following detailed descriptions when considered in conjunction with the accompanying drawings.

BRIEF DESCRIPTION OF THE DRAWINGS

FIG. 4 is a view in elevation taken along line 4—4 of FIG. 3;

FIG. 5 is a view in elevation taken along line 5—5 of FIG. 3;

FIG. 6 is a perspective view of the foil showing the leader threaded through the foil and hook; and FIG. 7 is a perspective view showing the foil tied to the hook;

Referring now to FIGS. 1-4, the foil 10 is composed of a front section 12 and an angled rear flap section 14. The rear section acts as a foil to cause upward lift when the flap 14 is pointed upwardly and downward diving when the flap 14 is pointed downwardly. The flap forms an angle with a horizontal plane through hook greater than 90° and less than 180°, usually from 110° to 160°. The front or rear section may be curved side to side to form a scoop-like effect or the foil can be gently curved along the front to rear axis. The rear flap 14 can be narrower or wider than the front section 10. Preferably the foil is a unitary structure slightly diverging, with a moderate side-to-side curvature.

As shown in FIGS. 2-5, the foil 10 contains a set of channels 16, 18 extending through the foil 10 at an elevation opposite a slot or socket 20 formed in the front wall 22 of the foil. The socket 20 is configured to frictionally receive the eye of a hook not shown. The socket is oriented to match the eye, usually horizontally for straight eyes formed of tapered wire loops formed alongside the shank of a hook.

Referring now to FIGS. 6, the preferred hook 23 has a shank 24 gracefully tapering toward the eye end and formed into a loop 26 with the end 28 bent alongside the shank 24. The hook 23 preferably also tapers from the bend 30 to the point 32 so that the center of gravity is shifted toward the bend without interfering with appearance or strike efficiency. A barb 34 may be formed at the tip 32. The double-taper hook may be formed by evenly drawing wire at both ends, forming the loop at one end and the bend at the other end. A barb is hand-formed by cutting wire and bending out a barb. The taper could also be formed by etching or metal casting.

Referring now to FIG. 1, a streamer-type fly 40 is formed on the hook 23 by attaching thread 42 at the end of the tapered loop 26 and running it towards the bend stopping directly over the point 32 of the hook 22. A strip 44 of rabbit fur may be tied in at the bend with thread and pectoral fins, not shown, may be formed near the eye 26.

Figure 1:
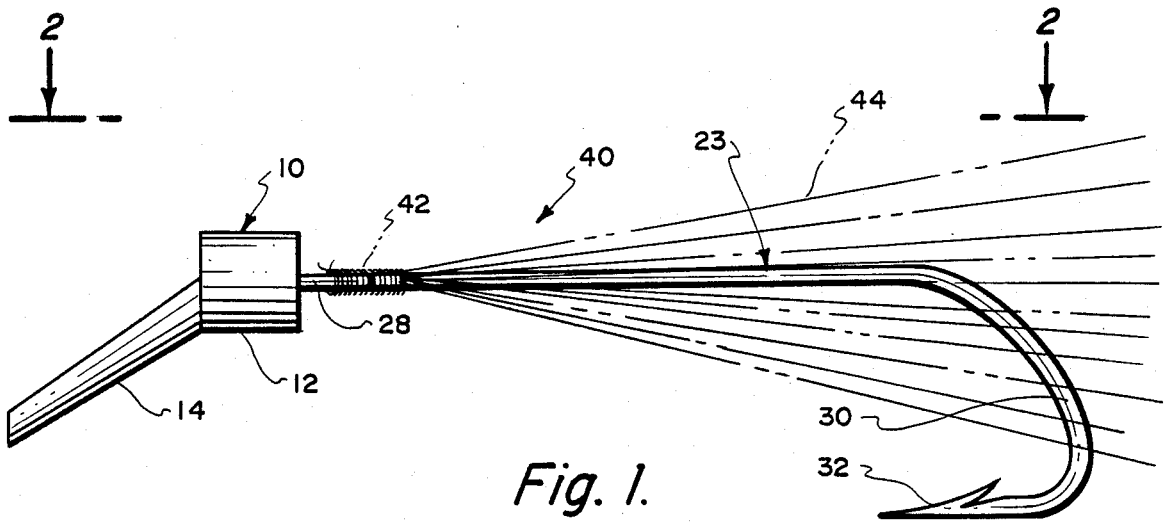
FIG. 1 is a side view in elevation of the foil of the invention shown attached to a hook and having fly materials tied to the shank of the hook.
Figure 2:
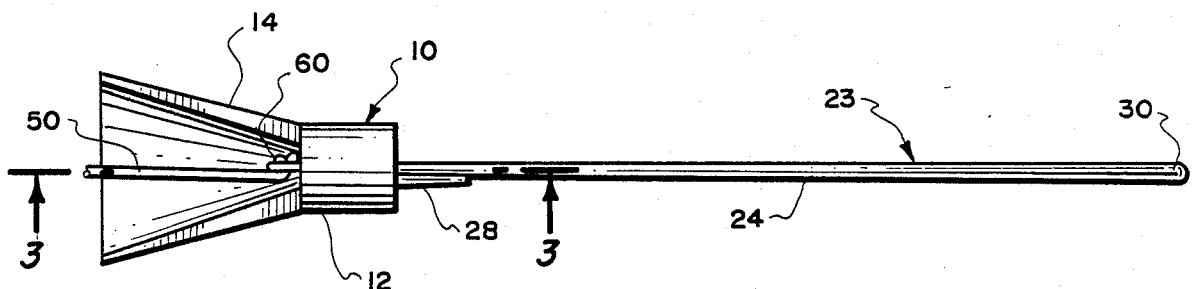
FIG. 2 is a top view in elevation of the foil of the invention.
Figure 3:
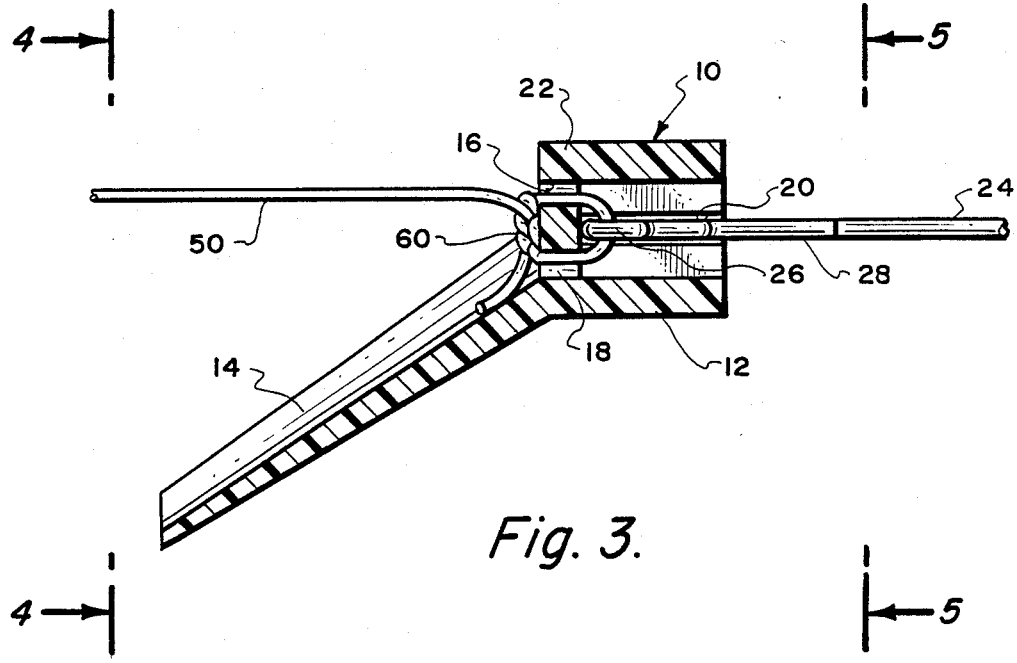
FIG. 3 is a view in section taken along line 3—3 of FIG. 2.

The body of the fly is built up with thread and other materials and the rabbit strip is brought forward and tied off. The fly 40 is finished by tying in wool, hair or other materials.

Referring now to FIGS. 5 and 7, the hook 23 and the foil 10 are assembled by threading a leader 50 through the channel 16, the loop 26 of the eye of the hook 23 and back through the other channel 18. The hook 23 is slid so that the eye 26 enters the socket 20 by pulling the end 54 of the leader 50 until the eye 26 is seated in the socket 20. The end 54 of the leader is then tied to form a know 60 against the wall 22 of the front section 12 of the foil. The foil can readily be reversed or removed by releasing the eye of the hook from the socket and rotating the foil or sliding it off the leader.

Since individual fishermen have such unique and special preferences for hooks with different sized or oriented eyes, in order to make the foil useful with a variety of hooks, the socket in the foil 10 could be made to fit a large eye hook and a set of sleeve bushings could be provided. The sleeves would all have the same outside dimension and configuration as the socket but each would have a different internal bore to fit the various eyes. The sleeves can either be pressed into the socket or can be slipped onto the eye of the hook, not shown.

It is to be realized that only preferred embodiments of the invention have been described and that numerous substitutions, modifications and alterations are permissible without departing from the spirit and scope of the invention as defined in the following claims.

What is claimed is:

1. A foil for a fly comprising:
   a rear section including an end wall, the front side of the end wall being attached to a body portion having a socket adapted to releasably receive a straight loop eye of a first hook;
   a front section attached to the rear section at an angle adapted to cause the fly to move upwardly or downwardly; and
   a pair of thread receiving channels extending through said end wall on each side of the socket.

2. A foil according to claim 1 in which the thread receiving channels are parallel and formed generally along an axis parallel to the socket.

3. A foil according to claim 1 in which the rear section is curved.

4. A foil according to claim 1 formed of lightweight material.

5. A foil according to claim 4 in which the material is a synthetic resin.

6. A foil according to claim 1 in which the front section forms an angle between 110° and 160° with said end wall.

7. A foil according to claim 1 further including a hook with the loop eye received in the socket.

8. A foil according to claim 7 in which the hook also contains a taper decreasing from the bend of the hook to the point of the hook.

* * * * *